(12) United States Patent
Brotherston et al.

(10) Patent No.: US 6,378,865 B1
(45) Date of Patent: Apr. 30, 2002

(54) SHEET TRANSPORT SYSTEM

(75) Inventors: Colin Peter Brotherston; Martin Lane, both of Hampshire (GB)

(73) Assignee: De La Rue International Limited, Basingstroke (GB)

( * ) Notice: Subject to any disclaimer, the term of this patent is extended or adjusted under 35 U.S.C. 154(b) by 0 days.

(21) Appl. No.: 09/719,224

(22) PCT Filed: Oct. 26, 1999

(86) PCT No.: PCT/GB99/03533

§ 371 Date: Dec. 11, 2000

§ 102(e) Date: Dec. 11, 2000

(87) PCT Pub. No.: WO00/26862

PCT Pub. Date: May 11, 2000

(30) Foreign Application Priority Data

Nov. 4, 1998 (GB) .............................................. 9824162

(51) Int. Cl.⁷ ................................................. B65H 5/02
(52) U.S. Cl. ..................... 271/272; 271/198; 271/202; 271/275; 198/575; 198/577
(58) Field of Search ................. 271/270, 272, 271/275, 202, 198; 198/575, 577, 623

(56) References Cited

U.S. PATENT DOCUMENTS

| | | | | |
|---|---|---|---|---|
| 4,000,943 A | * | 1/1977 | Bar-on | 271/275 |
| 4,416,534 A | * | 11/1983 | Kluger | 355/14 SH |
| 4,451,027 A | * | 5/1984 | Alper | 271/270 |
| 4,799,185 A | | 1/1989 | Taylor | |
| 4,988,905 A | | 1/1991 | Tolmie, Jr. | |
| 5,409,204 A | * | 4/1995 | Strohmeyer et al. | 271/270 |
| 5,960,930 A | * | 10/1999 | Hawkins | 198/575 |

FOREIGN PATENT DOCUMENTS

| | | |
|---|---|---|
| EP | 0 280 436 A2 | 8/1988 |
| EP | 0 841 642 A2 | 5/1998 |

\* cited by examiner

*Primary Examiner*—H. Grant Skaggs
(74) *Attorney, Agent, or Firm*—Oliff & Berridge, PLC

(57) ABSTRACT

A sheet transport system comprises a plurality of separately driven transport sections (1, 2; 4, 5, 6), each transport section being driven by a respective motor or motors (7–12). A control system (22–27, 50) controls operation of the motors (7–12). A monitoring system (37) monitors the performance of the motors, the control system being responsive to the monitoring system to maintain correct operation of the motors.

15 Claims, 3 Drawing Sheets

SHEET TRANSPORT SYSTEM

The invention relates to a sheet transport system, particularly for transporting documents of value such as banknotes.

Banknote transport systems are used to transport banknotes for a variety of purposes such as dispensing and accepting and also sorting in which banknotes are sorted in accordance with their denomination or authenticity. Typically, such sorters are provided with a number of transport sections for conveying banknotes through the system, detectors being provided along the banknote path to detect certain characteristics of the banknotes, these characteristics being used to actuate diverters to divert the banknotes to suitable storage locations. Typically, all the transport sections are powered by a single AC induction motor, the motive power from this motor being distributed to drive points known as capstans. The capstans in turn drive transport belts for transporting the banknotes.

Recently, there has been a tendency to enlarge the size of the machine, increasing the number of capstans required, to increase the speed of the transport system in order to improve the rate at which notes are processed.

The power from the single AC motor is transmitted to the capstans using a system of toothed belts and a drawback of this approach is that these belts consume a large percentage of the motor's power, generating considerable levels of noise and vibration. They also require a machine frame of considerable strength and occupy a large volume of space within the machine and inhibit transport arrangement design.

In accordance with the present invention, a sheet transport system comprises a plurality of separately driven transport sections, each transport section being driven by a respective motor or motors; a control system for controlling operation of the motors; and a monitoring system for monitoring the performance of the motors, the control system being responsive to the monitoring system to maintain correct operation of the motors.

In this invention, we propose a distributed drive approach in which each transport section is driven by its own motor or motors. This has a number of significant advantages. Firstly, a significant power saving is obtained. For example, a machine which uses 3 kW power based on a single AC induction motor can be run instead using a distributed drive system with a total motor output power of 1 kW. Further advantages include greatly reduced noise output, a light machine build, more space available within the system, and reduced manufacturing cost.

Each transport section is typically defined by a pair of friction feed belts, at least one of the friction feed belt being entrained around at least one drive capstan, directly driven by a respective motor. However, other forms of flexible transport conveyor mechanism are also envisaged.

In this context, we avoid the use of toothed timing belts and the like to connect each motor to the respective drive capstan and the term "directly" should be construed accordingly.

The motor could be coupled with the drive capstan via a gear system but preferably the drive capstan is mounted to a drive shaft, a rotor of the corresponding motor being directly secured to the drive shaft. Most conveniently, the drive shaft is journalled between spaced sets of bearings, the motor being located between the sets of bearings.

Thus, in the most preferred arrangement, a brushless DC servomotor could be used in place of the capstan bearing housing to achieve long life and high efficiency. The servomotor would form a bearing housing in its own right. Since the need to support high side loads from toothed timing belts will have been removed, smaller motor bearings will be capable of supporting the capstan.

A DC motor is preferred because it is simple to drive and control. It has high torque at zero speed and is power efficient.

Preferably, the control system comprises a plurality of digital controllers, one connected to each of the motors. The use of digital controllers is particularly preferred since these can provide a very accurate control of the motors. To that end, preferably, the motors behave in the manner of stepper motors, the digital controllers generating a control signal which defines a number of steps to be performed by the motor. In this case, the digital controllers act as position controllers to obtain a very precise movement in response to a demand or control signal. The advantage of using a position controller as a rate controller (to control the speed of the motor) is that the rate of rotation will be exactly the same as the rate at which the demand pulses are supplied. When combined with the digital control method, the resulting controller can cause a motor to run at a speed exactly related to the demand pulse frequency with no analogue settings or adjustments and no build up of error in position with time.

It is important to monitor the performance of each motor to ensure that it is being driven correctly. For this reason, the monitoring system is provided which could be used to monitor movement of the motor or preferably is adapted to monitor rotation of the drive capstans.

Conveniently, each controller includes a comparator for comparing the required performance of the corresponding motor with its actual performance, as reported by the monitoring system, and for modifying a control signal supplied to the motor to compensate for any difference. This provides a simple feedback system to ensure that the motor responds correctly to a demand or control signal.

One problem which can arise in sheet transport systems in which some motors are mechanically linked, via engaging friction feed belts of different transport sections, is that the friction between the belts may vary from a large value when the belts are new to a low value as they age. Furthermore, tolerances in belt thickness, capstan diameter and the type of belt paths can cause motor shafts to run at slightly different speeds and this variation can cause a variation in the way in which each motor responds to a demand or control signal. Although each motor could be driven individually by the control system, it is most convenient if the control system issues a single control signal to all the motors corresponding to the desired speed. In that case, preferably each controller includes an electronic gear box for adjusting the response of a motor to an input control signal, the control system including means for altering the adjustment provided by the electronic gear box so as to balance the performance of mechanically linked motors.

The use of an electronic gearbox allows the response of each motor to be adjusted with respect to the other motors and mechanically linked to it to compensate for these problems.

It should be understood that in a typical sheet transport system, not all the transport sections will be separately driven and some could be driven by frictional engagement with driven transport sections.

The transport sections also need not necessarily only include friction feed belts but could include other components of a sheet transport system such as sheet stackers, shredders and the like.

An example of a banknote sorting system according to the present invention will now be described with reference to the accompanying drawings, in which.

Figure 1:
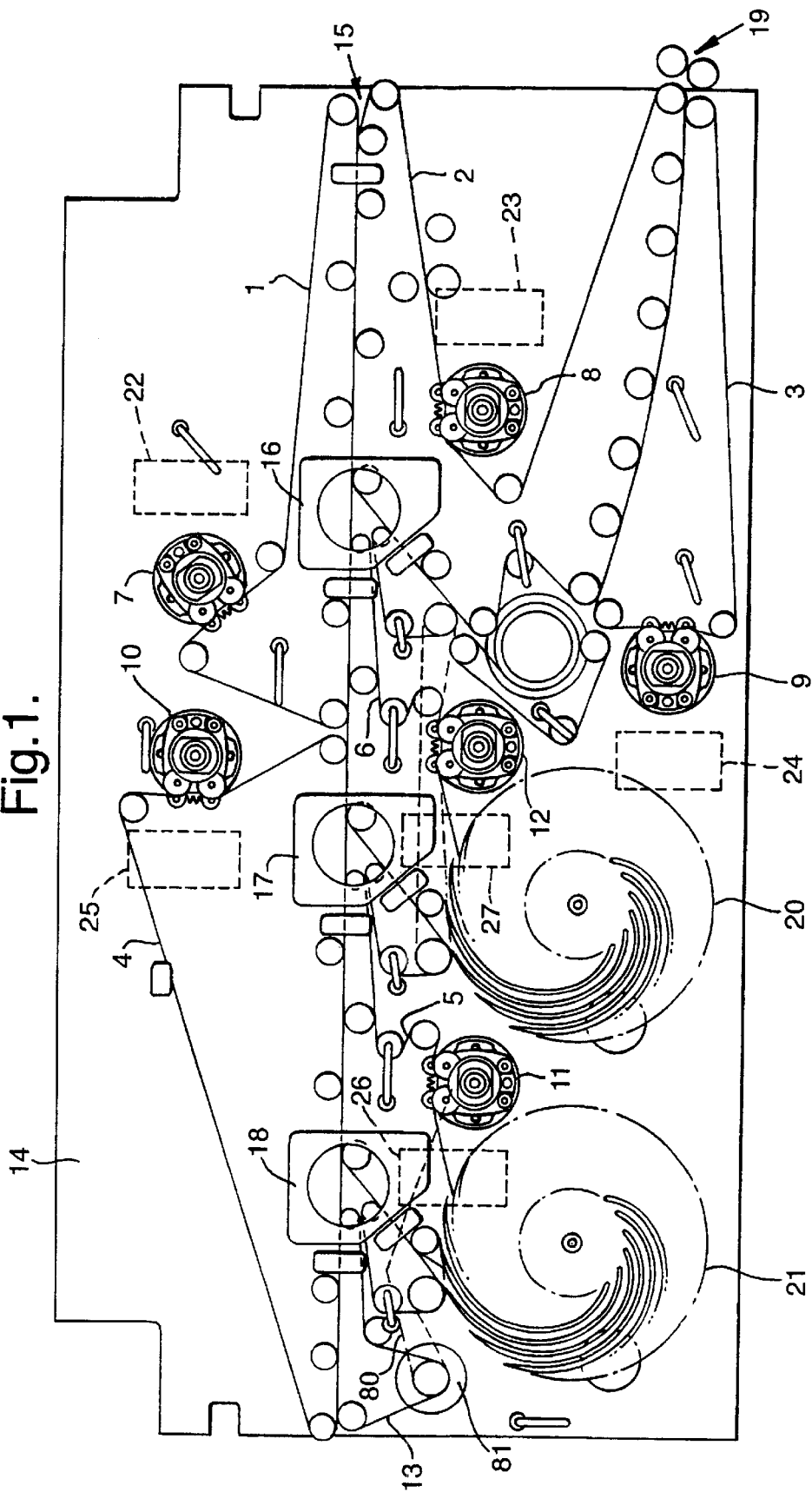
FIG. 1 is a side elevation of part of the system.

The part of the note sorting machine shown in FIG. 1 is defined by a series of friction feed belts 1–6, each driven by a respective DC servomotor 7–12. In addition to the friction feedbelts 1–6, there are a number of other friction feedbelts such as a feed belt 13 which is driven by servomotor 11 via a belt 80 (on the rear of the backplate 14) and a motorless capstan 81.

All the feedbelts are entrained around idler rollers (unnumbered) mounted to a backplate 14.

In operation, banknotes enter the transport section defined by belts 1,2 at 15 and are fed past a number of detectors (not shown) which determine characteristics of the banknotes and actuate diverters 16–18 respectively. If the diverter 16 is actuated, the banknotes are diverted down to an outlet position 19. If the diverter 17 is activated, the banknotes are diverted into a stacker wheel 20, and if the diverter 18 is actuated, the banknotes are diverted to a stacker wheel 21.

Each servomotor 7–12 is coupled with a respective controller 22–26. The controllers are mounted on the rear surface of the backplate 14.

Figure 2:
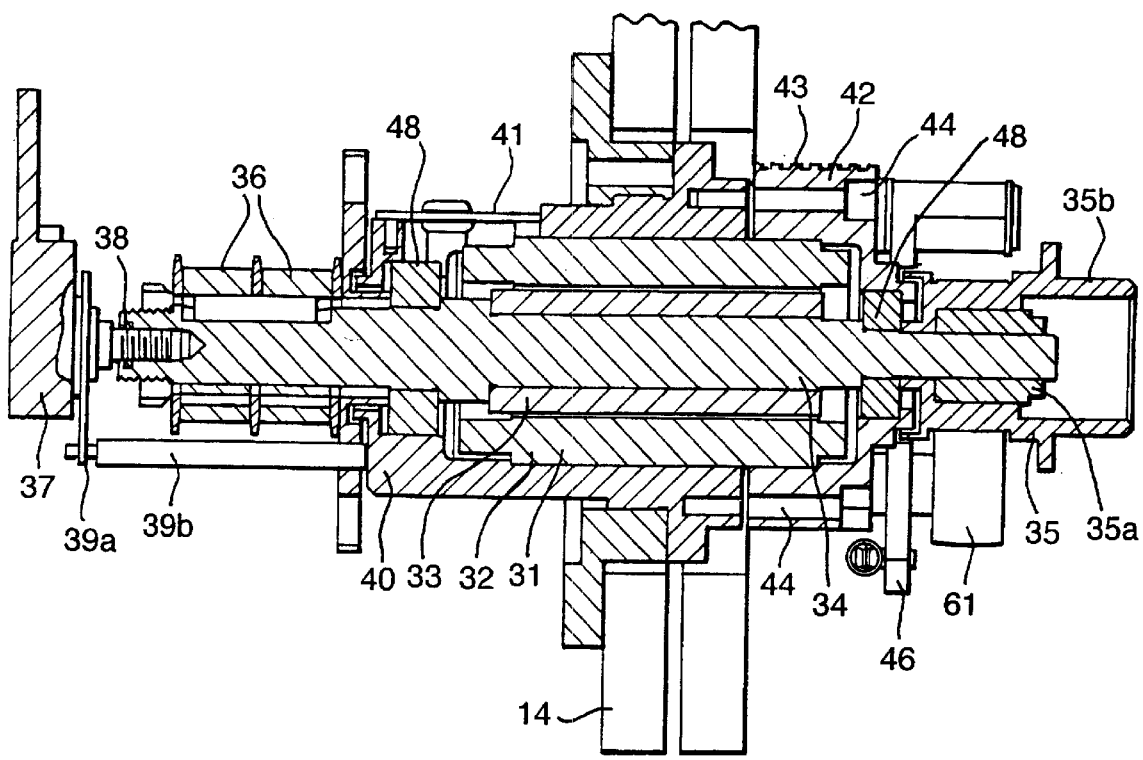
FIG. 2 is a longitudinal section through a drive capstan and motor.
Figure 3:
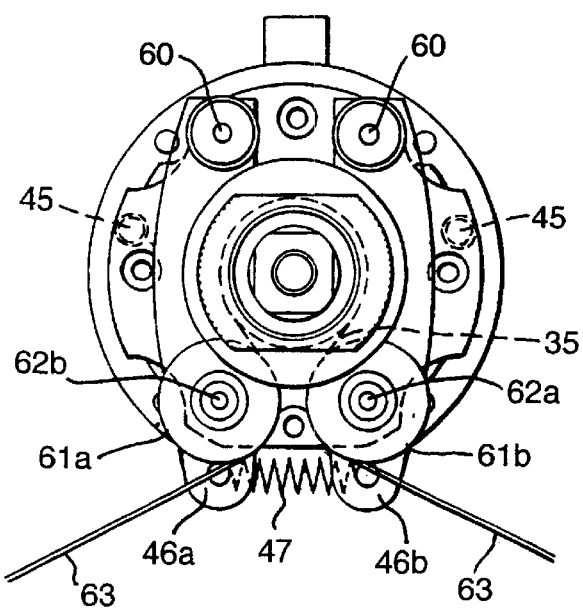
FIG. 3 is an end view of the arrangement shown in FIG. 2.

The construction of one of the servomotors 7–12 is shown in FIGS. 2 and 3. FIG. 2 shows a cross-section of an individual drive capstan and motor. The motor is shown generally at 31 and comprises a stator 32 and a rotor 33. The rotor 33 is attached to a capstan drive shaft 34. A capstan 35 is mounted directly on the front of the drive shaft 34 for engagement with a friction feedbelt (not shown). A taper lock coupling 35a couples the capstan 35 and drive shaft 34 in a non rotational manner. The capstan 35 has an extension 35b which allows an operator to rotate the capstan by hand.

A pair of auxiliary pulleys 36 are non-rotatably mounted on the rear end of the drive shaft 44 behind the backplate 14. These pulleys 36 may be used to drive small mechanisms to which it is not cost effective to provide a separate motor.

A rotary encoder 37 is mounted at the rear end of the drive shaft 34 and is driven via an O-ring 38. The body of the encoder 37 is torsionally constrained by a plate 39a and a post 39b attached to a rear motor housing 40. The rear motor housing 40 also carries a plate 41 which holds grommets which support the motor wires. A front motor housing 42 has small ridges 43 to aid heat dispersion and to provide a cooler surface for operators. The front motor housing 42 is bolted directly to rear motor housing 40 as shown at 44.

The arrangement of the tension arms and the capstan is shown in FIG. 3. The tension arms 46a, 46b are rotatably mounted on pins 60 non rotatably mounted to the motor housing 42. Belt pulleys 61a, 61b are rotatably mounted on pins 62a, 62b non rotatably mounted on the tension arms 46a, 46b. A single spring 47 is mounted between the two tension arms 46a, 46b. Belt 63, is of a length which, when the capstan is not being driven, causes the tension arms 46 not to rest against the stops 45 and it to be tensioned by the spring 47, is wrapped as shown around the inner periphery of the belt pulleys 61a, 61b and the capstan 35.

The capstan may be driven in either direction, the tension arm 46 on the tight side of the belt being forced into contact with the adjacent stop 45 and spring 47 controlling the belt tension on the slack side of the belt. Thus high belt drive tension is provided for drive in either direction without the assembly having to be changed in any way.

It will be noted that mounting the motor 31 between the capstan bearings 48 saves space while mounting the motor rotor 33 directly to the capstan shaft 34 reduces the cost and number of components required. Furthermore, using brushless motors reduces noise and increases lifetime.

Figure 4:
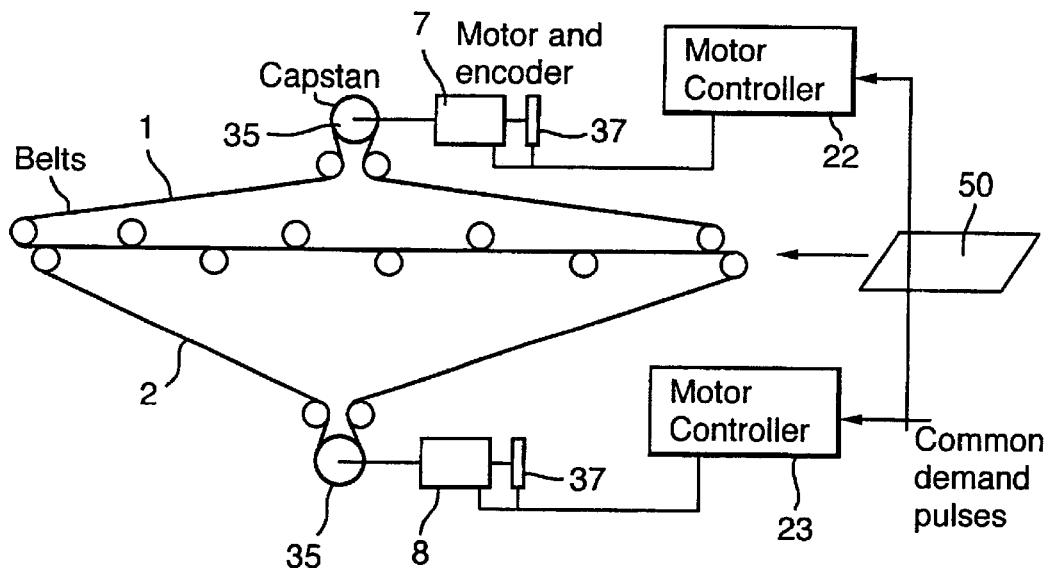
FIG. 4 is a block diagram illustrating the method of control of two transport sections; and, FIG. 5 is a block diagram of a motor controller.

As described above, each motor 7–12 (or 31 in FIG. 2) is driven by a respective motor controller 22–27. In FIG. 4, two mechanically linked transport sections defined by the belts 1,2 are shown schematically with their respective motors and motor controllers. The motor controllers in turn are controlled from a central machine controller 50 which supplies common demand pulse to each motor controller 22,23 (and the other motor controllers 24–27). The encoder 37 attached to each motor provides feedback pulses which can be used to monitor the performance of the respective motor.

In a simple arrangement, each motor controller includes a comparator which compares the number of demand pulses received from the machine controller 50 with the feedback pulses received from the encoder 37 and adjusts the control signal fed to the motor to compensate for any mismatch.

However, some problems can arise where the transport sections are mechanically linked together by friction between abutting friction feed belts such as the belts 1,2. The friction between the belts may vary from a large value when the belts are new to a low value as they age. The ratio of the motor to belt movement is defined and is nominally equal for both belts. However small variations in belt capstan size and belt thickness can cause variations in the ratio. Thus two or more motors may be linked mechanically with slightly different ratios. If the friction between the belts is high the mismatch in ratio will cause one motor to rotate at a different rate to the other. However since the drive systems are being supplied with a common demand frequency the motor controllers will still attempt to drive the motors at exactly the same rate. The controllers will attempt to correct the resulting change in angular position by supplying more current to the slower motor and less current to the faster motor. This will cause the motors to generate a shear force between the belts which will attempt to overcome the friction and allow the motors to rotate at the same rate. If the friction is high enough eventually the faster motor will be driving in the opposing direction. The resulting drive will now be very inefficient. The forward driving motor will be overloaded as it is having to drive both the belt systems and oppose the other motor.

Figure 5:
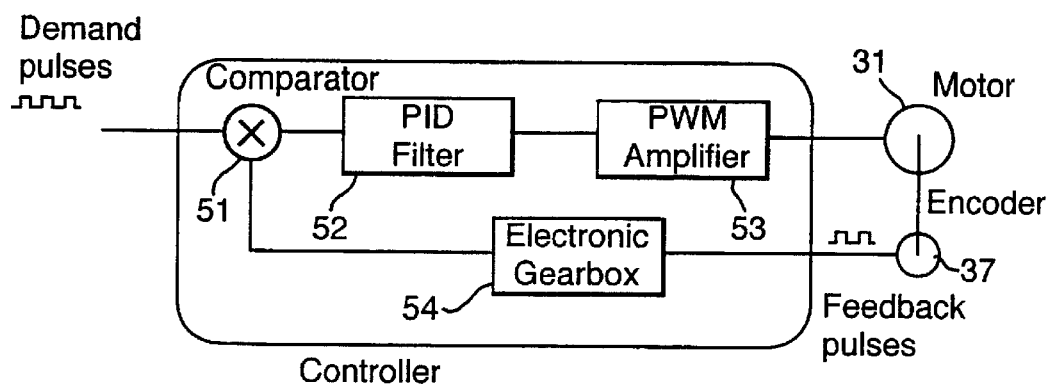

In order to overcome this problem, a more sophisticated form of motor controller is used as shown in FIG. 5. As can be seen in FIG. 5, the motor controller includes a comparator 51 which receives demand pulses from the machine controller 50 and feedback pulses from the encoder 37. The output of the comparator is fed to a PID (Proportional Integral and Differential) filter 52 to provide a drive signal to a pulse width modulation (PWM) amplifier 53 whose output is fed directly to the motor 31. In order to be able to compensate for mechanical linkage between the motor 31 and another motor, an electronic gearbox 54 (which can be realised in hardware or software) is provided between the encoder 37 and the comparator 51. The electronic gearbox function 54 factors the feedback pulses by an amount which can be varied by the machine controller 50. The effect of the electronic gearbox factor is to alter the ratio of motor movement to the rate of demand. Thus the electronic gearbox could be used to offset any motor speed mismatch caused by the mechanical linkage of other motors.

In order to effect an electronic adjustment, a means of measuring the amount of current being supplied to the motors must be found. Conveniently the output of the PID filter 52 is directly related to the amount of drive (current) supplied to the motor by the PWM amplifier 53. Thus if this signal is read by the machine controller 50 it could run an algorithm to compare several drive systems and make modifications to the electronic gearboxes until the amounts of drive to each motor are in balance.

A means of communicating with the motor controllers 22–27 while they are running or stationary in order to measure the current and alter the gear ratio is also required.

It will be appreciated that the motor controllers will typically be implemented by suitable circuitry based on programmed microprocessors.

In the example shown in FIG. 4, each motor controller 22,23 initially drives the respective motor with mechanical linkage ratio of approximately 1:1 and with an unknown amount of friction.

Both controllers 22 are identical. They are driven by a common demand pulse train. In each controller the demand pulse train is fed into the comparator 51 which subtracts the feedback pulse train supplied by the encoder 37. The feedback signal may be modified by the electronic gearbox 54 which can add or subtract pulses at a defined rate. When the controllers are initially set up the gear ratio will be set to the design value. (typically 1:1).

If the demand pulse rate is higher than the feedback pulse rate the output of the comparator 51 will become steadily greater. This output applied via the PID filter 52 to the PWM amplifier 53 will cause more current to be supplied to the motor 31. The torque supplied by the motor will increase until the drive speeds up such that the demand and the feedback pulse become the same. If the friction between the two motors prevents this from happening then eventually the output of the comparator 51 will become very great and the controller will shut down and show a fault condition.

If the demand pulse rate is lower than the feedback pulse rate the output of the comparator 51 will become steadily less. The output applied via the PID filter 52 to the PWM amplifier 53 will cause less current to be supplied to the motor 31. The torque supplied by the motor will reduce until the drive slows down such that the demand and the feedback pulse rate become the same. If the friction between the two motors prevents this from happening then eventually the output of the comparator will become negative and the motor will be attempting the drive in the opposite direction.

The current supplied to the motors is gauged by using the output of the PID filter 52 which is used to determine the direction and level of drive supplied by the PWM amplifier 53. The output is in a convenient digital form. It is necessary to use an averaging technique to the value of the PID output since there are usually significant high frequency fluctuations.

An Adaptive Control Algorithm (ACA) is included in the machine controller 50. A number of different methods may be used in the ACA to compare the drive levels and alter the gear ratio electronically to compensate for the mechanical ratio mismatch. A simple method would be to adjust the gear ratios in such a way that the drive levels become the same for each motor controller. Typically one controller would be used as a master and the ratio of the other would be modified to balance the amount of drive to each motor.

The maximum amount of adjustment that can be applied to a controller should be limited to 5% or less and is preferably limited to 1% to prevent serious speed mismatch if the mechanical friction linking the two drive systems should happen to be very small. Thus the ACA cannot substantially alter the controller speed of any drive on the machine.

Here follows a typical example.

Initially the two controllers 22,23 will be set up with identical parameters. This includes the same gear ratio.

When the machine is running the machine controller 50 will periodically request the value of the drive level for each controller. The time interval at which the machine controller checks the value of the drive levels may be several minutes.

The drive levels are compared by the Adaptive Control Algorithm (ACA). If the values indicate that the drives are not balanced the ACA can alter the gear ratio on one of the controllers.

The cycle is repeated at the specified time interval and gradually the gear ratios will be modified to remove any imbalance between the drives.

The following table shows how mechanical ratio mismatch can cause drive imbalance and how it may be corrected electronically by modifying the electronic gear ratio.

In the example shown in the table it is assumed that motor A is mechanically linked to motor B such that it rotates slightly faster than motor A.

Initially the electronic ratios of the controllers are set to the default of 1:1.

It can be seen that the drive levels of the controllers are imbalanced at the first reading. The electronic ratio of controller 1 is lowered by an increment. (in this case 5 in 4096). The drive levels are still imbalanced so the ratio is lowered again. This cycle repeats until the drive levels become balanced. Both motors are now driving in the same direction under full speed control.

|  |  | Current supplied to motors | |
| --- | --- | --- | --- |
| Ratio Controller A | Ratio Controller B | Drive level controller A | Drive level controller B |
| 4096:4096 (1:1) | 4096:4096 (1:1) | −1.5 | 4.5 |
| 4096:4091 | 4096:4096 (1:1) | −0.5 | 4 |
| 4096:4086 | 4096:4096 (1:1) | 0.5 | 3.5 |
| 4096:4081 | 4096:4096 (1:1) | 1.5 | 2.5 |
| 4096:4076 | 4096:4096 (1:1) | 2.5 | 1.5 |
| 4096:4078 | 4096:4096 (1:1) | 2 | 2 |

This method is especially suitable for digital controllers since the algorithm can process digital information directly.

What is claimed is:

1. A sheet transport system comprising a plurality of separately driven transport sections, each transport section having a pair of contacting drive portions which define a transport path, each portion being independently driven by a respective motor; a control system for controlling operation of the motors; and a monitoring system for monitoring the performance of the motors, the control system being responsive to the monitoring system to maintain correct operation of the motors.

2. A transport system according to claim 1, wherein each transport section is defined by a pair of friction feed belts, at least one of the friction feed belts being entrained around at least one drive capstan directly driven by a respective motor.

3. A system according to claim 2, wherein the drive capstan is mounted to a drive shaft, a rotor of the corresponding motor being directly secured to the drive shaft.

4. A system according to claim 3, wherein the drive shaft is journalled between spaced sets of bearings, the motor being located between the sets of bearings.

5. A system according to claim 2, wherein the monitoring system is adapted to monitor rotation of the drive capstans.

6. A system according to claim 5, wherein the monitoring system comprises an encoder disk secured for rotation with the capstan.

7. A system according claim 1, wherein the control system comprises a plurality of digital controllers, one connected to each of the motors.

8. A system according to claim 7, wherein the motors comprise servo motors, the digital controllers generating a control signal which defines discrete angular steps to be performed by the motor.

9. A system according to claim 7, wherein each digital controller generates a PWM control signal to the respective motor.

10. A system according to claim 9, wherein the PWM control signal is transmitted to the control system.

11. A system according to claim 7, wherein each controller includes a comparator for comparing the required performance of the corresponding motor with its actual performance, as reported by the monitoring system, and for modifying a control signal supplied to the motor to compensate for any difference.

12. A system according to claim 7, wherein the control system is adapted to supply a common activation signal to the digital controllers, the activation signal defining a required motor speed or rotational amount.

13. A system according to claim 12, wherein each controller includes an electronic gear box for adjusting the response of a motor to an input control signal, the control system including means for altering the adjustment provided by the electronic gear box so as to balance the performance of mechanically linked motors.

14. A system according to claim 13, wherein the amount of adjustment of the electronic gearbox ratio is limited to 5%.

15. A system according to claim 14, wherein the amount of adjustment of the electronic gearbox ratio is limited to 1%.

* * * * *